United States Patent [19]

Kleykamp

[11] 4,312,383

[45] Jan. 26, 1982

[54] HOSE CONSTRUCTION AND APPARATUS FOR AND METHOD OF MAKING SAME

[75] Inventor: Donald L. Kleykamp, Dayton, Ohio

[73] Assignee: Dayco Corporation, Dayton, Ohio

[21] Appl. No.: 141,839

[22] Filed: Apr. 21, 1980

[51] Int. Cl.³ .................... F16L 11/11; B29C 27/04
[52] U.S. Cl. .................................. 138/103; 138/121; 138/137; 138/141; 156/272; 174/47; 264/508; 425/174.8 R; 425/370
[58] Field of Search ............... 138/103, 121, 137, 141; 156/272; 174/47; 219/10.43, 10.53; 264/508; 425/174.8 R, 370

[56] References Cited

U.S. PATENT DOCUMENTS

| | | | |
|---|---|---|---|
| 2,393,541 | 1/1946 | Kohler | 156/272 X |
| 3,280,430 | 10/1966 | Antrobus | 425/370 |
| 3,461,014 | 8/1969 | James | 156/272 |
| 3,538,209 | 11/1970 | Hegler | 264/508 |
| 3,574,031 | 4/1971 | Heller, Jr. et al. | 156/272 X |
| 3,620,875 | 11/1971 | Guglielmo, Sr. et al. | 156/272 |
| 3,945,867 | 3/1976 | Heller, Jr. et al. | 156/272 X |
| 3,996,323 | 12/1976 | Hegler et al. | 264/508 |

Primary Examiner—Laramie E. Askin
Attorney, Agent, or Firm—Joseph V. Tassone

[57] ABSTRACT

A hose construction and apparatus for and method of making such hose construction are provided wherein the hose construction comprises a corrugated outer tube made of polymeric material and having alternating projections and recesses with the recesses having inwardly facing convex surfaces and an inner tube made primarily of polymeric material and having smooth inside and outside surfaces with the outside surface being bonded against the convex surfaces and wherein the inner tube has at least one longitudinally extending polymeric portion comprising same which has electrically conductive particles embedded therein in which the polymeric portion serves as a matrix for the particles and with the polymeric portion being heat fused to the convex surfaces.

23 Claims, 10 Drawing Figures

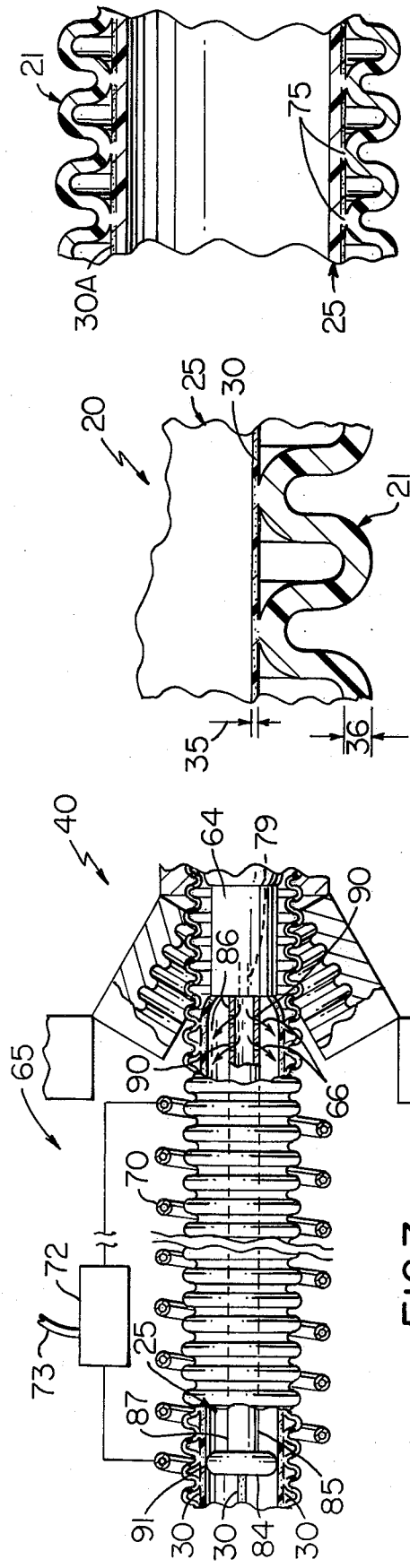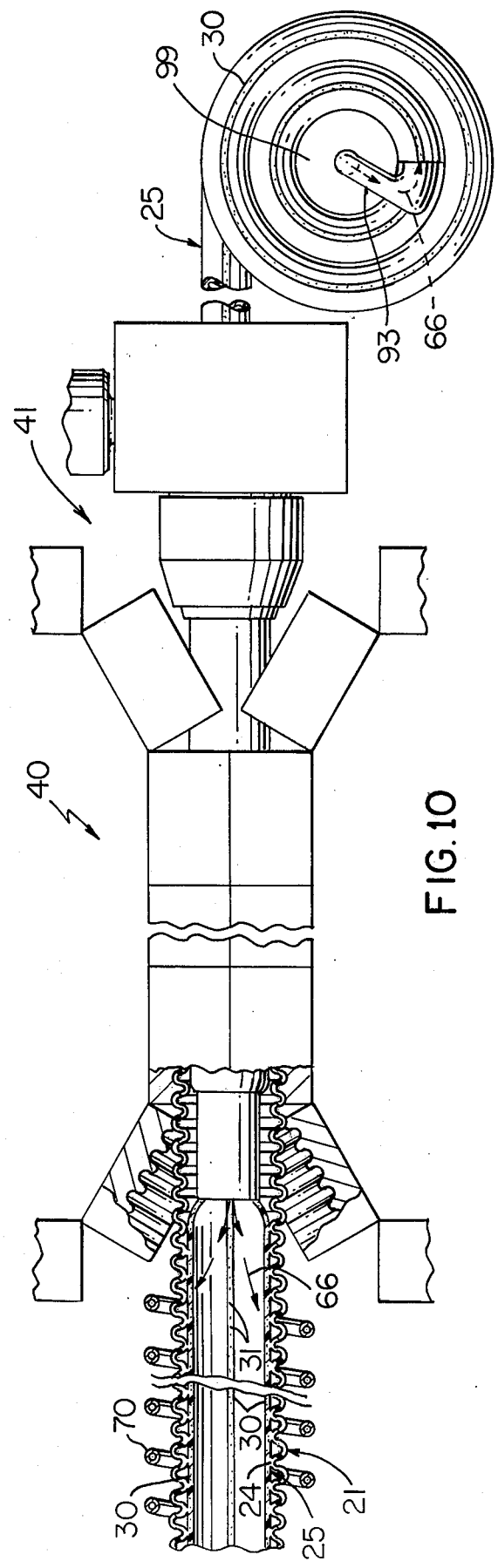

HOSE CONSTRUCTION AND APPARATUS FOR AND METHOD OF MAKING SAME

BACKGROUND OF THE INVENTION

1. Field of the Invention

This invention relates to hose constructions and in particular to a corrugated-smooth bore hose construction made primarily of polymeric material.

2. Prior Art Statement

It has been proposed heretofore to provide a polymeric hose construction comprised of an outer corrugated tube having an integral plain inner liner of smooth walled form wherein the outer corrugated tube and inner liner are made of the same material and are provided by substantially simultaneous concentric extrusion thereof and as is disclosed in U.S. Pat. Nos. 3,280,430 and 3,538,209. It was also mentioned in this latter patent that the outer tube and inner tube may be made of different materials.

However, while each of these patents suggests substantially simultaneous extrusion of a plain inner liner concentrically within a corrugated outer tube, with the liner and outer tube theoretically adhering to each other, it has been found that as a practical matter such liner and outer tube tend to pull apart after extended use because the adherence therebetween is not optimum.

SUMMARY

It is a feature of this invention to provide a hose construction comprised of a corrugated outer tube made of a polymeric material and having alternating projections and recesses with the recesses having inwardly facing convex surfaces and an inner tube made primarily of polymeric material and having smooth inside and outside surfaces and wherein the outside surface of the inner tube is bonded against the convex surfaces in a tenacious manner to, in essence, provide a corrugated-smooth bore hose construction capable of providing an extended service life.

Another feature of this invention is to provide a hose construction of the character mentioned in which the inner tube has at least one longitudinally extending polymeric portion comprising same which has electrically conductive particles embedded therein and wherein the polymeric portion serves as a matrix for the particles and wherein such polymeric portion adjoining the particles is heat fused to the convex surfaces through the use of the particles.

Another feature of this invention is to provide a hose construction of the character mentioned in which the electrically conductive particles are metal particles.

Another feature of this invention is to provide a hose construction of the character mentioned in which the polymeric material of the outer tube and the polymeric material of the inner tube is the same synthetic plastic material.

Another feature of this invention is to provide a hose construction of the character mentioned in which the polymeric portion of the inner tube is an outer sleeve-like portion defined as an integral part of such inner tube.

Another feature of this invention is to provide a hose construction of the character mentioned in which the sleeve-like portion has a wall thickness which is a fractional part of the wall thickness of the inner tube.

Another feature of this invention is to provide a hose construction of the character mentioned in which the polymeric portion is a ribbon-like portion defined as an integral part of the inner tube.

Another feature of this invention is to provide a hose construction of the character mentioned which has at least another longitudinally extending ribbon-like polymeric portion in addition to the first-named portion wherein such other portion is also heat fused to the convex surfaces of the corrugated outer tube.

Another feature of this invention is to provide a hose construction of the character mentioned in which the polymeric material of the outer tube is a synthetic thermoplastic material and the polymeric material of the inner tube is also a synthetic thermoplastic material.

Another feature of this invention is to provide a hose construction of the character mentioned in which the electrically conductive metal particles comprising a longitudinally extending portion of the inner tube are particularly adapted to be heated by an electrical induction heater to provide precise heating of the matrix-like polymeric material surrounding the metal particles to assure tenacious heat fusion thereof to the convex surfaces and adjoining portions of the outer tube.

Another feature of this invention is to provide an improved apparatus for making a hose construction of the character mentioned.

Another feature of this invention is to provide an improved method of making a hose construction of the character mentioned.

Therefore, it is an object of this invention to provide an improved hose construction as well as an improved apparatus for and method of making such a hose construction having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 7 is a view with parts in elevation, parts in cross section, and parts broken away illustrating a plug device for the inner tube of the hose construction which enables pressurizing such inner tube and radial expansion thereof;

FIG. 8 is an enlarged fragmentary cross-sectional view of the hose construction of FIG. 1 particularly illustrating the typical relative thicknesses of the inner tube and outer tube;

FIG. 9 is a view similar to FIG. 4 illustrating a modification of the hose construction which utilizes the inner tube of FIG. 5; and FIG. 10 is a view similar to the forward portion of FIG. 6 illustrating another exemplary embodiment of an apparatus and method of this invention which may be utilized in making the hose construction of this invention.

DETAILED DESCRIPTION

Figure 1:
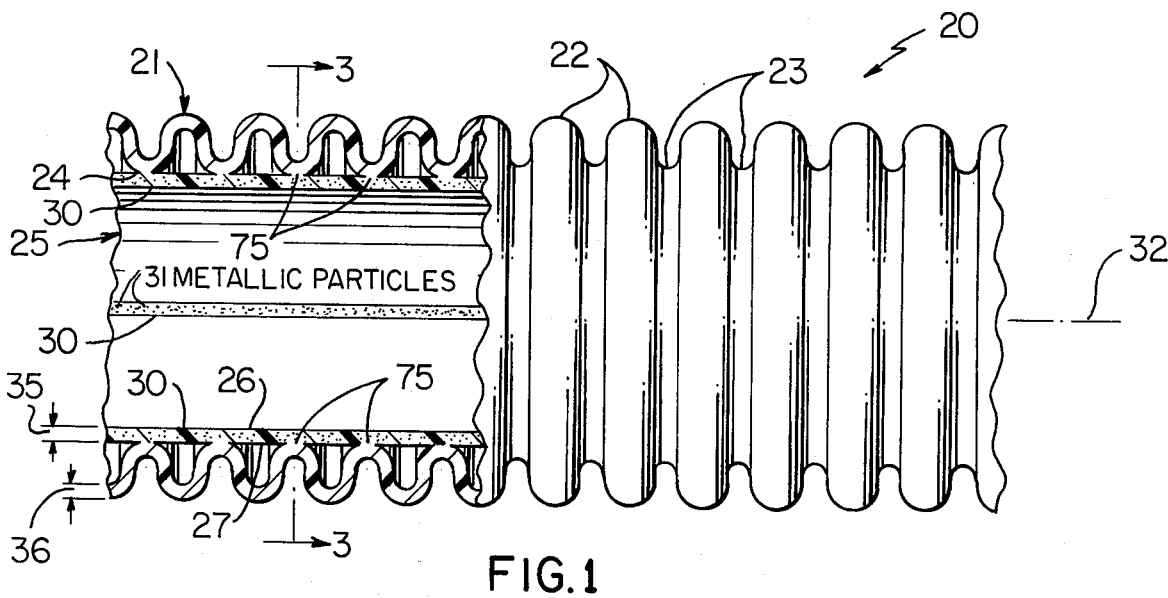
FIG. 1 is a view with parts in elevation, parts in cross section, and parts broken away of one exemplary embodiment of the hose construction of this invention, defined by a corrugated outer tube and a plain inner tube bonded concentrically therewithin with the wall thickness of the inner tube being shown larger than normal to highlight the structural features of the hose construction.
Figure 3:
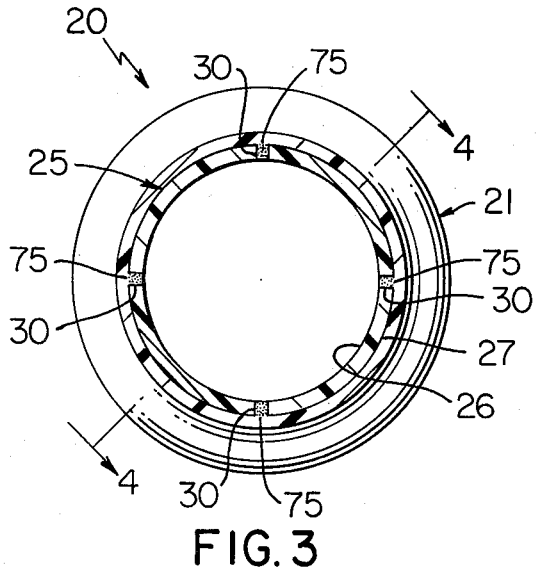
FIG. 3 is a cross-sectional view taken essentially on the line 3—3 of FIG. 1.
Figure 4:
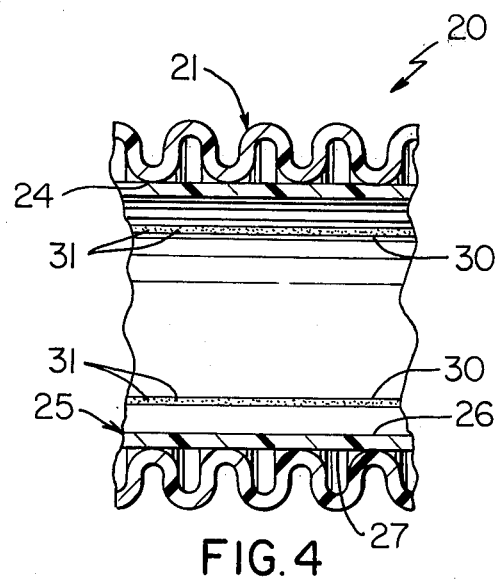
FIG. 4 is a view taken essentially on the line 4—4 of FIG. 3.

Reference is now made to FIG. 1 of the drawings which illustrates one exemplary embodiment of the hose construction of this invention which is designated generally by the reference numeral 20. The hose construction 20 comprises a corrugated outer tube 21 made of a polymeric material and having alternating projections 22 and recesses 23 with the recesses 23 having inwardly facing convex surfaces 24. The hose construction 20 has an inner tube 25 which is made primarily of polymeric material and the inner tube 25 has a smooth inside surface 26 and a smooth outside surface 27 with the outside surface 27 thereof being bonded against the convex surfaces 24. The corrugated outer tube 21 enables the hose construction 20 to be used in applications where it is subjected to substantial internal pressures and/or vacuum yet such hose construction has substantial flexibility and the smooth inside surface 26 of the inner tube 25 assures fluid flow therethrough in a nonturbulent manner.

The inner tube has at least one longitudinally extending polymeric portion 30 comprising the same and in this example of the invention the inner tube 25 has a plurality of four longitudinally extending polymeric portions disposed substantially 90° apart and each polymeric portion 30 has electrically conductive particles 31, preferably in the form of electrically conductive metal particles, embedded therein and the polymeric portion 30 serves as a matrix for the particles.

Each polymeric portion 30 is heat fused to the convex surfaces 24 through the use of the metal particles 31 and as will be described in detail subsequently.

In the exemplary embodiment of this invention illustrated in FIGS. 1-4 and 8 each polymeric portion 30 is a ribbon-like portion which is defined as an integral part of the inner tube 25 and each ribbon-like portion extends in an associated substantially rectilinear path parallel to a central longitudinal axis 32 of the hose construction 20. Each ribbon-like portion also extends over an arcuate length 33 which is shown as a few degrees (less than 10 degrees) when compared to the entire 360 degree circumference of the inner tube 25. However, each ribbon-like portion 30 may extend over a substantial arcuate length of greater than 10° and indeed over an arcuate length which may be generally of the order of 30°, for example.

Each ribbon-like portion 30 has electrically conductive metal particles 31 embedded in the matrix-like polymeric material thereof, as previously mentioned. The metal particles may be ferrous particles, aluminous particles, copper particles, or similar electrically conductive materials and may define between ¼ and ½ of the volume of the associated ribbon.

The corrugated outer tube 21 and the inner tube 25 are made of polymeric material and in some applications the polymeric material may be the same synthetic plastic material for both tubes 21 and 25. In other applications the tubes 21 and 25 may be made of different synthetic plastic materials. However, regardless of whether the polymeric material used in defining the outer tube 21 and inner tube 25 is the same material or whether different materials are used to define such tubes, it is preferred that each tube 21 and 25 be made of a synthetic thermoplastic material and the use of metal particles embedded in portions of the inner tube assures a tenacious heat-fused bond between tubes 21 and 25 as will be explained subsequently.

Figure 2:
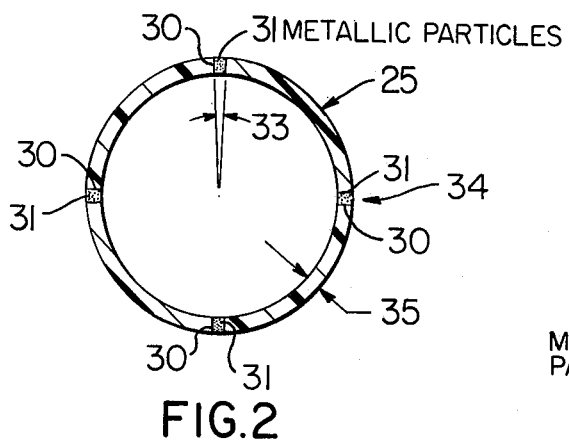
FIG. 2 is a cross-sectional view of the inner tube of FIG. 1 prior to bonding same within the corrugated outer tube of FIG. 1.

Each ribbon-like polymeric portion 30 of the inner tube 25 defines the entire wall thickness of a corresponding portion of the inner tube and as illustrated typically at 34 in FIG. 2; and, each ribbon-like portion blends smoothly with adjoining portions of the inner tube 25. Each ribbon-like portion has a particular wall thickness which is the same as the wall thickness 35 of the portions of the inner tube 25 which adjoin opposite side edges of each ribbon-like portion 30.

The outer tube 21 has a substantially uniform wall thickness throughout its alternating projections and recesses and such uniform wall thickness is indicated at 36 in FIG. 1. The inner tube 25 also has the previously mentioned wall thickness 35 which is substantially uniform throughout its cross section. As mentioned earlier and for ease of drawing presentation the wall thickness 36 is shown as being substantially equal to the wall thickness 35. However, it is to be understood that in actual practice the wall thickness 36 is generally of the order of several (two to ten) times greater than the wall thickness 35. To highlight this feature FIG. 8 is a view illustrating a fragmentary portion of the hose construction 20 in which the wall thickness 36 of tube 21 is five times greater than the wall thickness 35 of the inner tube 25. Typical actual dimensions would be 0.040 inch for the thickness 36 and 0.008 inch for the dimension 35. With these relative dimensions the hose construction 20 is assured of having optimum strength and flexibility yet the inner tube 25 with its smooth inside surface 26 assures fluid flow therethrough with minimum interference of the type normally encountered when the hose construction has a corrugated inside surface.

Figure 6:
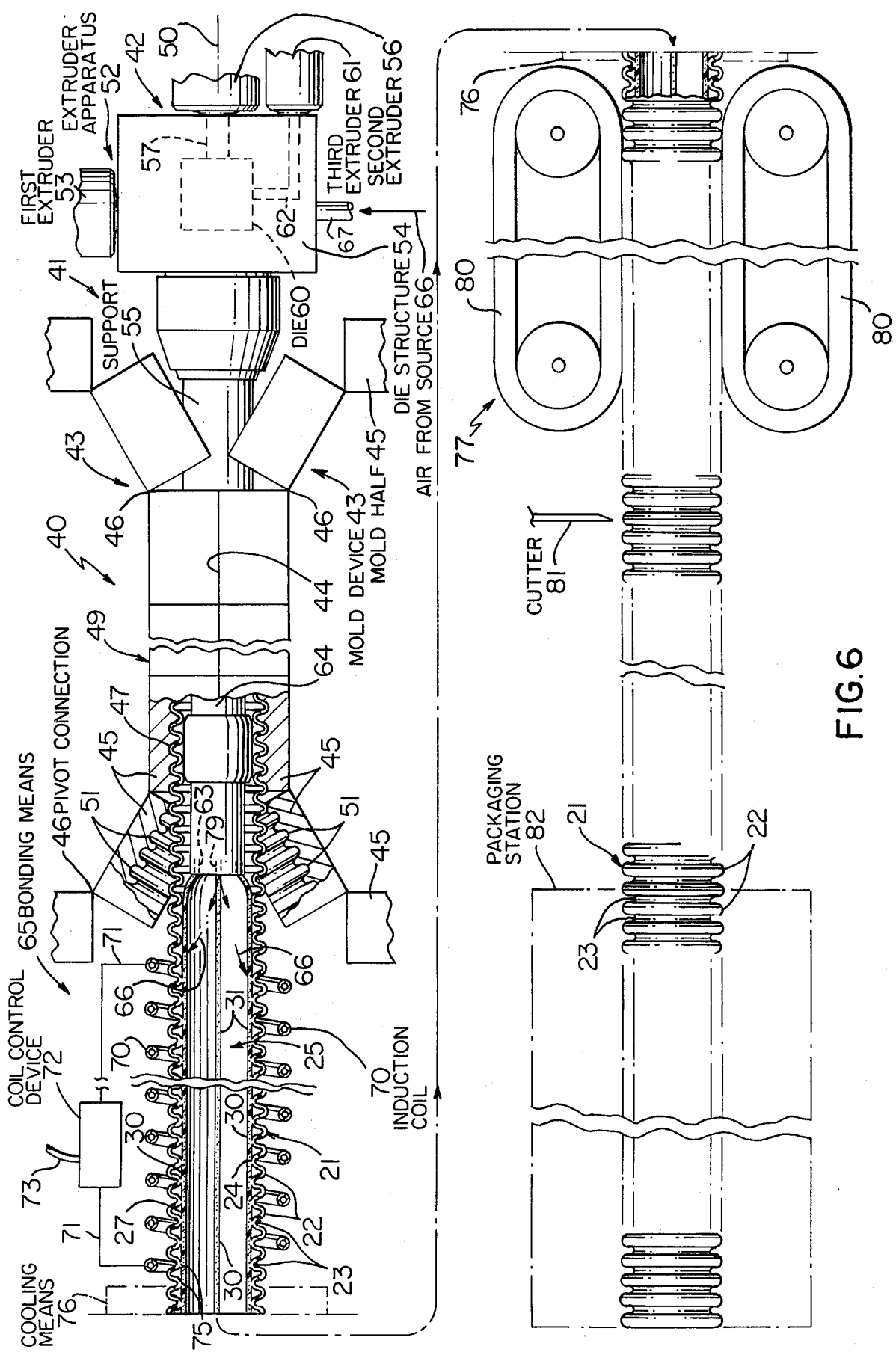
FIG. 6 is a view with parts in elevation, parts in cross section, parts shown schematically, and parts broken away illustrating one exemplary embodiment of the apparatus and method of this invention which may be utilized in making the hose construction of this invention.

The hose construction 20 is preferably made in a substantially continuous uninterrupted process utilizing the apparatus and method of this invention and such apparatus and method are illustrated in FIG. 6 of the drawing and designated generally by the reference numeral 40. The apparatus 40 comprises means 41 for forming the corrugated outer tube 21 of a polymeric material and having the previously described alternating projections 22 and recesses 23 with the recesses having inwardly facing convex surfaces 24 and the forming means 41 may be apparatus of the type disclosed in the above-mentioned U.S. Pat. No. 3,538,209 and the basic apparatus of this patent is incorporated herein by reference thereto and thus will not be described in detail. The apparatus 40 also comprises means for forming the inner tube 25, primarily of polymeric material, with such forming means being designated by the reference numeral 42. The forming means 42 forms the smooth inside surface 26 and the smooth outside surface 27.

The forming means 41 comprises a pair of mold devices each designated generally by the same reference numeral 43 and the devices 43 are suitably supported in a known manner for movement in a pair of endless paths having a common rectilinear portion 44. Each device 43 is moved in a similar manner as a so-called crawler tread.

Each mold device 43 is comprised of a plurality of mold halves 45 in which adjoining mold halves are suitably pivotally fastened together as indicated at 46. As the mold halves are moved by their devices 43 they define what may be considered a moving housing 49 and the moving housing has a continuous undulating tubular surface 47 which has a central axis 50 which coincides with the axis 32 of the hose construction 20 to be defined.

A plurality of grooves 51 are provided in each mold half 45 and each groove extends into its mold half in a direction radially away from the axis 50. The grooves 51 in the mold halves 45 cooperate to define spaced annular grooves and hence what may be considered undulations or corrugations in the continuous tubular surface 47 during movement thereof along the common portion 44 of the endless path whereby the annular grooves 51 define the undulating or corrugated outside surface of the outer tube 21 and the entire wall thickness of the tube is corrugated by vacuum means (not shown) used with the mold devices 43 and as is known in the art.

The forming means 41 also has extrusion means 52 for extruding polymeric material within the moving housing 49 to define the outer tube 21. The extrusion means 52 comprises a first extruder 53 of known construction which is suitably connected by a special die structure 54 to a support 55 which has an annular die (not shown) which extrudes molten thermoplastic material in tubular form within the mold devices 43 to define the corrugated outer tube 21.

The apparatus 40 also has the previously mentioned means 42 for forming the inner tube 25 and such means comprises extrusion means 42 comprising a second extruder 56 which is operatively connected by a passage 57 to an extrusion die 60 within the die structure. The die 60 enables the inner tube 25 to be extruded substantially concentrically within the outer tube 21.

The extrusion die 60 has integral means for forming the inner tube with at least one longitudinally extending polymeric portion 30 and in this example such means provides simultaneous formation of four longitudinally extending polymeric portions 30 with each polymeric portion having the previously described electrically conductive metal particles 31 provided as an integral part thereof wherein the polymer of each polymeric portion 30 serves as a matrix for its particles 31. The polymeric portions 30 are provided from a third extruder 61 which extrudes molten thermoplastic material having metal particles 31 mixed therethrough in a substantially uniform manner and such molten material is introduced into the die 60 through a passage 62 in the die structure 54 to four spaced apart locations in the die 60. The die 60 serves to combine plain molten polymeric material from the extruder 56 and metal particle loaded polymeric material from the extruder 61 to define the tube 25 with its polymeric ribbon-like portions 30. The forming means 42 thus enables the inner tube 25 to be made as a continuous tube with one or more ribbon-like portions 30 with the ribbon-like portions being capable of being made of the same polymer as the remainder of the tube or of different polymers due to the use of a plurality of extruders. The apparatus 40 has means for disposing the inner tube 25 within the outer tube 21 and such means comprises the die structure 54, the support 55, and a structure 64 supported by the support 55. The structure 64 has a tubular cylindrical passage 63 therethrough for conveying the inner tube 25.

The apparatus 40 also has means for bonding the outside surface 27 of the inner tube 25 against the convex surfaces 24 and such means is designated generally by the reference numeral 65.

The bonding means 65 comprises means for urging radially the inner tube 25 with its polymeric portions 30 spaced 90 degrees apart to thereby urge such polymeric portions against the convex surfaces 24. The urging means in this example comprises fluid pressure means in the form of air under pressure which is indicated by arrows 66. The pressurized air 66 is provided from a suitable source (not shown) through a conduit 67 which extends into the die structure 54. A conduit 79 extends through the structure 54, support 55, and structure 64 and introduces the air 66 within the tube 25 as it exits structure 64 thereby urging same against the convex surfaces 24.

The bonding means of the apparatus 40 also comprises electrical induction coil means shown as an electrical induction coil 70 which is suitably connected by leads 71 to a coil control device 72 which is shown schematically by a rectangular box. The control device 72 is provided with electrical power from a suitable power source through an electrical cable assembly 73.

The induction coil 70 is disposed concentrically around the corrugated outer tube 21 and once the polymeric ribbon-like portions 30 of the inner tube 25 are urged by pressurized air 66 firmly against the convex surfaces 24 the energized induction coil 70 heats the electrically conductive metal particles 31 in the ribbon-like portion 30 by the well known principle of induction heating. This heating causes partial melting of the polymeric material in each matrix portion 30 and heat is also transferred to the adjoining convex surfaces 24 and to those parts of the outer tube 21 which adjoin such convex surfaces causing a partial melting of such parts into a slightly tacky condition at the interface and causing tacky adhesion therebetween and in essence a heat fused area or bond 75 at each convex surface 24 upon cooling. The heat fusion thus produced may be considered a self bonding with a tenacious bond between the ribbon-like portions 30 and the convex surfaces 24. This heat fused bond 75 has greater strength than any bond that could be produced by utilizing only the heat available during extrusion of a plain ordinary inner tube made of polymeric material against a plain ordinary corrugated outer tube 21 also made of polymeric material.

The apparatus 40 has means 76 for cooling the hose construction 20 and in particular the partially molten parts of the outer tube and the partially molten matrix-like portion of each ribbon-like portion 30. The cooling means or device 76 may comprise any suitable cooling means known in the art and is indicated schematically by a rectangular block in FIG. 6.

The apparatus 40 also has means for moving the completed and cooled hose construction 20 and such moving means is designated generally by the reference numeral 77. The moving means 77 of this example comprises a pair of endless belt devices, each designated by the same reference numeral 80. The belt devices engage diametrically opposed portions of the hose construction 20 firmly gripping same therebetween as such construction exits the cooling device and serves to pull same through the entire apparatus.

The apparatus 40 has a cutting apparatus which is shown schematically as a cutting knife or cutter 81. The cutter 81 is used to cut predetermined lengths of the completed hose construction 20 prior to packaging thereof.

The predetermined lengths of the hose construction 20 are packaged at a packaging station indicated by dot-dash lines defining a rectangular block 82. One or more of such lengths of the hose construction may be packaged for further processing or packaged for shipment and sale.

As indicated previously the apparatus 40 comprises bonding means 65 which comprises urging means in the form of pressurized air 66. The urging means also comprises a plug device 84 as shown, in FIG. 7. The plug device or plug 84 is made of a suitable high strength non-metallic material such as a hard synthetic plastic material. The plug 84 is supported in a cantilevered manner from the end of the structure 84 by a suitable high-strength rigid rod 85 also made of a synthetic plastic material.

The rod 85 of this example is a tubular rod and has its inner end 86 fixed to the end of the support 64 while the plug 84 is fixed to the outer end 87 of such rod. The rod 85 surrounds the tube or conduit 79 and has openings 90 therein to allow air 66 to exit conduit 79 and pressurize the inner tube 25.

The plug 84 has a rounded edge 91 which is substantially semicylindrical and such edge assures sliding movement of the tube 25 thereacross in a non-binding manner. In addition, the plug is sized to assure (even with some leakage therepast) that the air 66 will maintain sufficient pressure to urge the tube 25 radially.

Figure 5:
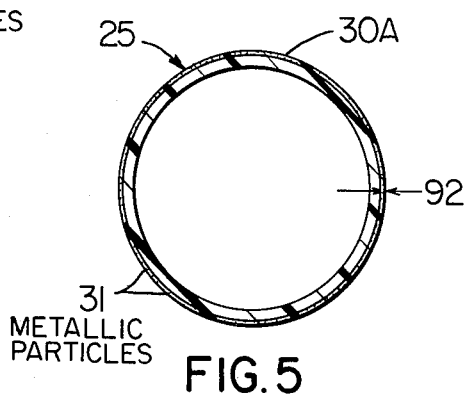
FIG. 5 is a view similar to FIG. 2 illustrating a modification of the inner tube which may be used interchangeably with the inner tube of FIG. 2 to define another exemplary embodiment of the hose construction of FIG. 1.

In this disclosure of the invention the apparatus 40 is shown forming the inner tube 25 with a plurality of ribbon-like portions 30. However, it will be appreciated that the inner tube 25 may have an outer sleeve-like portion designated by the reference numeral 30A essentially as illustrated in FIG. 5. The inner tube 25 may be defined utilizing the extruder 56 of FIG. 6 to form the main inner part of the tube 25 and the extruder 61 to form the outer sleeve-like portion 30A concentrically around the main part of the inner tube 25. The extrusion die 60 of apparatus 40 may be suitably modified to define the tube 25 of FIG. 5 having thickness 92 defining its outer sleeve-like portion 30A. The thickness 92 is preferably a small fractional part of the thickness of the inner portion of the tube 25.

The apparatus 40 may also be modified as illustrated in FIG. 10 to enable forming of the inner tube 25 in an independent manner and then using same to make the hose construction 20. Accordingly, the corrugated outer tube 21 may be made as described above. However, the independently made inner tube 25 (of the type shown in FIG. 1) is wound on a suitable supply roll 99 and supported for unwinding rotation. The supply roll 99 has a freely rotatable pipe connection 93 which has the innermost turn of the tube connected in fluid-tight relation thereto. The outer end of the pipe connection 93 is supplied with pressurized air 66 from a suitable air source (not shown) whereby with this technique the air 66 serves to urge the tube 25 against the convex surface 24 enabling bonding thereof using the induction coil 70 as previously described. The bonding action is provided in a continuous process and is provided while providing unwinding rotation of supply roll 99 and continuous forming of the corrugated tube 21 therearound. The operation of the remainder of the apparatus and method 40 is as described previously. It will be appreciated that with the simplified apparatus 40 of FIG. 10 the inner tube 25 may be defined on one or more independent tube forming machines, as desired.

In the modified apparatus 40 and method illustrated in FIG. 10, the independently formed inner tube is shown as having a plurality of four longitudinally extending ribbons 30 each having metal particles 31 embedded therein as previously described. However, it will be appreciated that such independently formed tube 25 may be of the type having an outer sleeve 30A provided with metal particles 31 and as illustrated in FIG. 5 and an inner tube of this latter type would be processed in a similar manner as described previously in connection with FIG. 10.

However, regardless of whether the inner tube 25 is of the type illustrated in FIG. 2 or of the type illustrated in FIG. 5, in each instance the key to the apparatus and methods of this invention is the electrical induction coil 70 which provides precisely controlled heating through the use of electrically conductive metal particles 31 in either one or more ribbon-like portions 30 or an outer sleeve 30A.

The inner tube 25 with either ribbon-like portions 30 or sleeve 30A may be made of the same polymeric material as the outer tube 21 or of different polymeric materials. In either instance the resulting hose construction 20 has flexibility yet optimum strength and is capable of withstanding high internal pressure and/or vacuum with a minimum tendency of the inner tube to pull away from the outer tube.

It will also be appreciated that the matrix-like polymeric material used to define the ribbon-like portions 30A of the inner tube or the sleeve 30 of such inner tube may be the same material as the remainder of the inner tube or a different material, although the same material is preferred. In either case it is preferred a thermoplastic material be employed and that the thermoplastic material be compatible with the thermoplastic material used to define the outer tube 21.

While present exemplary embodiments of this invention, and methods of practicing the same, have been illustrated and described, it will be recognized that this invention may be otherwise variously embodied and practiced within the scope of the following claims.

What is claimed is:

1. In a hose construction comprising a corrugated outer tube made of polymeric material and having alternating projections and recesses with said recesses having inwardly facing convex surfaces and an inner tube made primarily of polymeric material and having smooth inside and outside surfaces with said outside surface being bonded against said convex surfaces, the improvement in which said inner tube has at least one longitudinally extending polymeric portion comprising same which has electrically conductive particles embedded therein and serving as a matrix for said particles, said one polymeric portion being a ribbon-like portion provided as an integral part of said inner tube and defining the entire wall thickness of a corresponding portion of said inner tube, and said one polymeric portion being heat fused to said convex surfaces after having been heat fused thereto through the use of said particles.

2. A hose construction as set forth in claim 1 in which said electrically conductive particles are metal particles.

3. A hose construction as set forth in claim 2 in which said polymeric material of said outer tube and said polymeric material of said inner tube are the same synthetic plastic material.

4. A hose construction as set forth in claim 2 in which said polymeric material of said outer tube and said polymeric material of said inner tube are different synthetic plastic materials.

5. A hose construction as set forth in claim 2 in which said inner tube has at least another longitudinally extending ribbon-like polymeric portion also provided as an integral part thereof which also has electrically conductive metal particles embedded therein and also serving as a matrix for its particles, said other ribbon-like portion also being heat fused to said convex surfaces after having been heat fused thereto through the use of said particles.

6. A hose construction as set forth in claim 5 in which said polymeric outer tube is a synthetic thermoplastic material and said polymeric material of said inner tube is a synthetic thermoplastic material.

7. A hose construction as set forth in claim 6 in which said other ribbon-like portion also defines the entire wall thickness of a corresponding portion of the inner tube, and each of said ribbon-like portions has a particular wall thickness which is the same as the wall thickness of adjoining portions of the inner tube.

8. A hose construction as set forth in claim 7 in which said outer tube has a substantially uniform wall thickness throughout its alternating projections and recesses, said uniform wall thickness being several times greater than said particular wall thickness.

9. A hose construction as set forth in claim 7 in which each of said ribbon-like portions extends in an associated substantially rectilinear path parallel to a central longitudinal axis of said hose construction and when viewing a substantially circular annular cross section of the hose construction each ribbon-like portion extends over an arcuate length generally of the order of a few degrees.

10. A hose construction as set forth in claim 9 in which each of said ribbon-like portions extends over said arcuate length thereof of less than 30 degrees.

11. A hose construction as set forth in claim 10 in which each of said ribbon-like portions has electrically conductive metal particles which define between ¼ and ½ of its volume.

12. In an apparatus for making a corrugated smooth bore hose construction comprising; means for forming a corrugated outer tube made of a polymeric material and having alternating projections and recesses with said recesses having inwardly facing convex surfaces; means for forming an inner tube made primarily of polymeric material and having smooth inside and outside surfaces; means for disposing said inner tube within said outer tube; and means for bonding said outside surface of said inner tube against said convex surfaces; the improvement in which; said means for forming said inner tube comprises means for forming said inner tube with at least one longitudinally extending polymeric portion provided as an integral part thereof and having electrically conductive particles embedded in a matrix-like portion thereof; said means for forming said inner tube being adapted to define said one longitudinally extending polymeric portion thereof as a ribbon-like portion which defines the entire wall thickness of a corresponding portion of the inner tube and blends smoothly with adjoining portions of the inner tube and said ribbon-like portion has a particular wall thickness which is the same as the wall thickness of said adjoining portions, and said means for bonding comprises, means for urging said inner tube radially to thereby urge said polymeric portion against said convex surfaces, and electrical induction coil means for disposition concentrically around said corrugated outer tube so that with said polymeric portion urged against said convex surfaces said induction coil means provides heating of said electrically conductive particles causing partial melting of parts of said outer tube which define said convex surfaces as well as partial melting of said matrix-like portion; said partially molten parts and matrix-like portion self-bonding upon cooling thereof.

13. An apparatus as set forth in claim 12 in which said means for forming said corrugated outer tube and said means for forming said inner tube comprise extrusion die means.

14. An apparatus as set forth in claim 13 and further comprising means for cooling said partially molten parts of said outer tube and said partially molten matrix-like portion.

15. An apparatus as set forth in claim 13 in which said means for urging comprises plug means for inserting into one end of said inner tube adjacent said induction coil means and air pressure means for expanding said tube while it is within said induction coil means.

16. An apparatus as set forth in claim 12 in which said means for forming said corrugated outer tube and said means for forming said inner tube comprise extrusion means for forming said tubes substantially concentrically.

17. An apparatus as set forth in claim 12 in which said means for forming said outer tube and said means for forming said inner tube comprises means for forming said tubes independently of each other, said means for disposing said inner tube within said outer tube comprises means for inserting said inner tube within said outer tube after forming thereof, and said means for urging said inner tube radially comprises plug means for insertion into one end of said inner tube and fluid pressure means for expanding said inner tube and providing said radial urging thereof.

18. An apparatus as set forth in claim 17 in which said fluid pressure means comprises pressurized air.

19. In a method of making a corrugated-smooth bore hose construction comprising the steps of; forming a corrugated outer tube of a polymeric material and having alternating projections and recesses with said recesses having inwardly facing convex surfaces; forming an inner tube primarily of a polymeric material and having smooth inside and outside surfaces; disposing said inner tube within said outer tube; and bonding said outside surface of said inner tube against said convex surfaces; the improvement in which; said step of forming said inner tube comprises forming said inner tube with at least one longitudinally extending polymeric portion provided as an integral part thereof and having electrically conductive particles embedded in a matrix-like portion thereof; said step of forming said inner tube with said one longitudinally extending polymeric portion comprises forming said inner tube with said polymeric portion as a ribbon-like portion which defines the entire wall thickness of a corresponding portion of the inner tube and blends smoothly with adjoining portions of the inner tube and said ribbon-like portion has a particular wall thickness which is the same as the wall thickness of said adjoining portions, and said bonding step comprises the steps of, urging said inner tube radially to thereby urge said polymeric portion against said convex surfaces, and moving said corrugated outer tube with said inner tube disposed therewithin and with said polymeric portion urged against said convex surfaces through an electrical induction coil to thereby heat said electrically conductive particles and cause partial melting of parts of said outer tube which define said convex surfaces as well as partial melting of said matrix-like portion; and cooling said partially molten parts and matrix-like portion to self-bond same.

20. A method as set forth in claim 19 in which said step of forming said corrugated outer tube comprises forming said outer tube employing extrusion die means.

21. A method as set forth in claim 20 in which said step of forming said inner tube comprises forming said inner tube employing die means and concentrically within said outer tube subsequent to said forming of said outer tube.

22. A method as set forth in claim 21 in which said steps of forming said outer tube and said inner tube comprise forming said tubes independently of each other, said step of disposing said inner tube within said outer tube comprises inserting said inner tube within said outer tube after independent forming thereof, and said step of urging said inner tube radially comprises providing plug means at one end of said inner tube and pressurizing said inner tube with fluid pressure means to provide said radial urging thereof.

23. A method as set forth in claim 22 in which said step of pressurizing said inner tube with fluid pressure means comprises pressurizing said inner tube with air under pressure.

* * * * *